United States Patent
Singaram et al.

(10) Patent No.: US 12,038,887 B2
(45) Date of Patent: *Jul. 16, 2024

(54) LOW-LATENCY DATABASE ANALYSIS USING EXTERNAL DATA SOURCES

(71) Applicant: ThoughtSpot, Inc., Mountain View, CA (US)

(72) Inventors: Siva Singaram, San Jose, CA (US);
Rakesh Kothari, San Jose, CA (US);
Naresh Kumar, Santa Clara, CA (US);
Jasmeet Singh Jaggi, Fremont, CA (US); Rahul Manikanta Balakavi, Mountain View, CA (US); Tushar Mahale, Milpitas, CA (US); Rahul Paliwal, Palo Alto, CA (US); Sandeep Kumar, Karnataka (IN)

(73) Assignee: ThoughtSpot, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,349

(22) Filed: Dec. 16, 2022

(65) Prior Publication Data

US 2023/0147571 A1 May 11, 2023

Related U.S. Application Data

(63) Continuation of application No. 16/681,006, filed on Nov. 12, 2019, now Pat. No. 11,544,239.
(Continued)

(51) Int. Cl.
*G06F 16/21* (2019.01)
*G06F 16/248* (2019.01)
(Continued)

(52) U.S. Cl.
CPC .......... *G06F 16/211* (2019.01); *G06F 16/248* (2019.01); *G06F 16/252* (2019.01); *G06F 16/27* (2019.01)

(58) Field of Classification Search
None
See application file for complete search history.

(56) References Cited

U.S. PATENT DOCUMENTS 7,395,258 B2 7/2008 Altinel et al.
8,577,913 B1 11/2013 Hansson et al.
(Continued)

FOREIGN PATENT DOCUMENTS

EP 268367 A2 5/1988
EP 1587011 A1 10/2005
(Continued)

OTHER PUBLICATIONS

Sayyadian et al., "Efficient Keyword Search Across Heterogeneous Relational Databases", 2007, IEEE, 346-355 (10 pp).
(Continued)

*Primary Examiner* — Kim T Nguyen
(74) *Attorney, Agent, or Firm* — Young Basile Hanlon & MacFarlane, P.C.

(57) ABSTRACT

A method and system may be implemented for automatically analyzing data in a database. A method for use in a low-latency database analysis system may include generating a schema. The schema may be based on a portion of an external database. The method may include storing the schema in an in-memory database. The method may include receiving a data-query. The method may include generating a resolved-request. The resolved-request may be based on the data-query and the stored schema. The stored schema may be used for executing the query on the external database. The method may include receiving results data respon- (Continued)

sive to the data-query from the external database. The method may include outputting the results data for display on a user interface.

20 Claims, 8 Drawing Sheets

Related U.S. Application Data

(60) Provisional application No. 62/760,481, filed on Nov. 13, 2018.

(51) Int. Cl.
*G06F 16/25* (2019.01)
*G06F 16/27* (2019.01)

(56) References Cited

U.S. PATENT DOCUMENTS

| | | |
|---|---|---|
| 9,275,132 B2 | 3/2016 | Roberts et al. |
| 9,305,034 B2 | 4/2016 | Kemmler et al. |
| 9,405,794 B2 | 8/2016 | Prakash et al. |
| 9,430,547 B2 | 8/2016 | Lightner et al. |
| 9,589,019 B2* | 3/2017 | Clifford .............. G06F 11/3447 |
| 10,896,182 B2 | 1/2021 | Bhattacharjee et al. |
| 11,016,957 B2 | 5/2021 | Mishra et al. |
| 11,086,869 B1 | 8/2021 | Aleti et al. |
| 11,275,733 B1 | 3/2022 | Batsakis et al. |
| 11,294,941 B1 | 4/2022 | Sammer et al. |
| 11,327,992 B1 | 5/2022 | Batsakis et al. |
| 11,620,303 B1* | 4/2023 | Roy ...................... G06F 16/313 707/736 |
| 11,620,336 B1* | 4/2023 | Batsakis ................. G06F 16/27 707/722 |
| 11,734,286 B2* | 8/2023 | Prakash ................ G06F 16/221 707/734 |
| 2004/0267730 A1 | 12/2004 | Dumais et al. |
| 2005/0027717 A1 | 2/2005 | Koudas et al. |
| 2005/0289124 A1 | 12/2005 | Kaiser et al. |
| 2007/0192300 A1 | 8/2007 | Reuther et al. |
| 2007/0219974 A1 | 9/2007 | Chickering et al. |
| 2007/0239661 A1 | 10/2007 | Cattell et al. |
| 2008/0109422 A1 | 5/2008 | Dedhia |
| 2009/0019019 A1 | 1/2009 | Jones et al. |
| 2009/0019022 A1 | 1/2009 | Schallert et al. |
| 2011/0113048 A1 | 5/2011 | Njemanze |
| 2012/0066217 A1 | 3/2012 | Eder |
| 2013/0339370 A1 | 12/2013 | Holstege et al. |
| 2014/0201241 A1 | 7/2014 | Wood et al. |
| 2014/0310232 A1 | 10/2014 | Plattner et al. |
| 2014/0337371 A1 | 11/2014 | Li |
| 2015/0039614 A1 | 2/2015 | Daly et al. |
| 2016/0342658 A1 | 11/2016 | Skrzypczak et al. |
| 2017/0270159 A1 | 9/2017 | Wang et al. |
| 2018/0150548 A1 | 5/2018 | Shah et al. |
| 2019/0108230 A1 | 4/2019 | Prakash et al. |
| 2020/0151206 A1 | 5/2020 | Balakavi et al. |
| 2020/0257675 A1 | 8/2020 | Wei et al. |
| 2023/0112250 A1* | 4/2023 | Agrawal .......... G06F 16/24537 707/714 |

FOREIGN PATENT DOCUMENTS

| | | | |
|---|---|---|---|
| EP | 2202658 | A2 | 6/2010 |
| EP | 2207106 | A2 | 7/2010 |
| WO | 0141002 | A1 | 6/2001 |
| WO | 2015009353 | A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).

Shi et al.: "50x Faster: Speeding Up an SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).

Blunschi et al: "SODA: Generating SQL for Business Users", Proceedings of the VLDB Endowment, vol. 5, No. 10, Aug. 27, 2012 pp. 932-935 (12 pp).

Baid et al: "Toward Scalable Keyword Search over Relational Data", Proceedings of the VLDS Endowment, vol. 3, No. 1-2, Sep. 1, 2010, pp. 140-149 (10 pp).

Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).

International Search Report and Written Opinion for PCT/US14/39230; Date of mailing Nov. 24, 2014 (16 pp).

Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub.-p-ermissionsoldid=559455322 [retrieved on May 11, 2014]; (8 pp).

Li et al: "Efficient Type-Ahead Search on Relational Data: a TASTIER Approach", Sigmod-Pods '09: Compilation Proceedings of the International Conference on Management Data 28th Symposium on Principles of Database Systems; Providence, RI,USA, Association for Computing Machines, New York NY Jun. 29, 2009, pp. 695-706 (12 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language" Oct. 1, 2018 (Downloaded Jan. 30, 2019), https://towardsdatascience.com/an-easy-introduction-to-natural-language-processing-b1e2801291c1, (11 pp).

Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).

Sisense, "Chasm and Fan Traps", https://documentation.sisense.com/latest/managing-data/working-with-data/chasm-fan-traps.htm, Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Extended European Search Report received in co-pending Application No. EP 19160657.3 dated Apr. 4, 2019 (11 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

Wikipedia, "Consistent hashing", https://en.wikipedia.org/wiki/Consistent_hashing, Date Unknown, Downloaded Aug. 15, 2019, (5 pp).

Morton, K., et al., "Dynamic Workload Driven Data Integration in Tableau", Proceedings of the 2012 International Conference on Management of Data, SIGMOD '12, Jan. 1, 2012, p. 807 (9 pp).

Extended European Search Report dated Jul. 26, 2019, issued in co-pending EP Application No. 19166422.6 (11 pp).

Extended European Search Report received in co-pending European Application No. 19209001.7 dated Mar. 18, 2020 (7 pp).

\* cited by examiner

LOW-LATENCY DATABASE ANALYSIS USING EXTERNAL DATA SOURCES

CROSS-REFERENCE TO RELATED APPLICATION

This application is a continuation of U.S. application patent Ser. No. 16/681,006, filed Nov. 12, 2019, which claims priority to and the benefit of U.S. Provisional Application Patent Ser. No. 62/760,481, filed Nov. 13, 2018, the entire disclosures of which are hereby incorporated by reference.

BACKGROUND

Advances in computer storage and database technology have led to exponential growth of the amount of data being created. Businesses are overwhelmed by the volume of the data stored in their computer systems. Existing database analytic tools are inefficient, costly to utilize, and/or require substantial configuration and training.

SUMMARY

Disclosed herein are implementations of methods and systems for low-latency database analysis using external data sources. Systems for low-latency database analysis using external data sources may minimize data movement from an external data source to the low-latency database analysis system. The low-latency database analysis system may directly execute queries on the external data source.

An aspect of this disclosure is an apparatus for low-latency database analysis using external data sources. Low-latency database analysis using external data sources includes a system that may include an in-memory database, a semantic interface, an external database compute unit, a relational search unit, and an interface unit. The semantic interface may include a database access layer. The database access layer may be configured to interface with the in-memory database, an external database, or both. The external database compute unit may be configured to generate a schema. The schema may be based on a portion of the external database. The database compute unit may be configured to store the schema in the in-memory database. The relational search unit may be configured to receive a data-query. The relational search unit may be configured to send the data-query to the semantic interface. The semantic interface may be configured to generate a resolved-request. The resolved-request may be based on the stored schema. The stored schema may be used for executing the query on the external database. The interface unit may be configured to receive results data responsive to the data-query from the external database. The interface unit may be configured to output the results data for display on a user interface.

Another aspect of this disclosure is an apparatus for low-latency database analysis using external data sources. Low-latency database analysis using external data sources includes a system that may include an in-memory database, a semantic interface, an in-memory database manager, an external database manager, a relational search unit, and an interface unit. The semantic interface may include a database access layer. The database layer may be configured to interface with the in-memory database, an external database, or both. The in-memory database manager may be configured to communicate with the in-memory database. The external database compute unit may be configured to generate a schema. The schema may be based on a portion of the external database. The external database manager may be configured to communicate with the external database compute unit. The external database manager may be configured to store the schema in the in-memory database. The relational search unit may be configured to receive a data-query. The relational search unit may send the data-query to the semantic interface. The semantic interface may be configured to generate a resolved-request. The resolved-request may be based on the stored schema. The stored schema may be used for executing the query on the external database. The interface unit may be configured to receive results data responsive to the data-query from the external database. The interface unit may be configured to output the results data for display on a user interface.

Another aspect of this disclosure is a method for use in a low-latency database analysis system. The method may include generating a schema. The schema may be based on a portion of an external database. The method may include storing the schema in an in-memory database. The method may include receiving a data-query. The method may include generating a resolved-request. The resolved-request may be based on the data-query and the stored schema. The stored schema may be used for executing the query on the external database. The method may include receiving results data responsive to the data-query from the external database. The method may include outputting the results data for display on a user interface.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
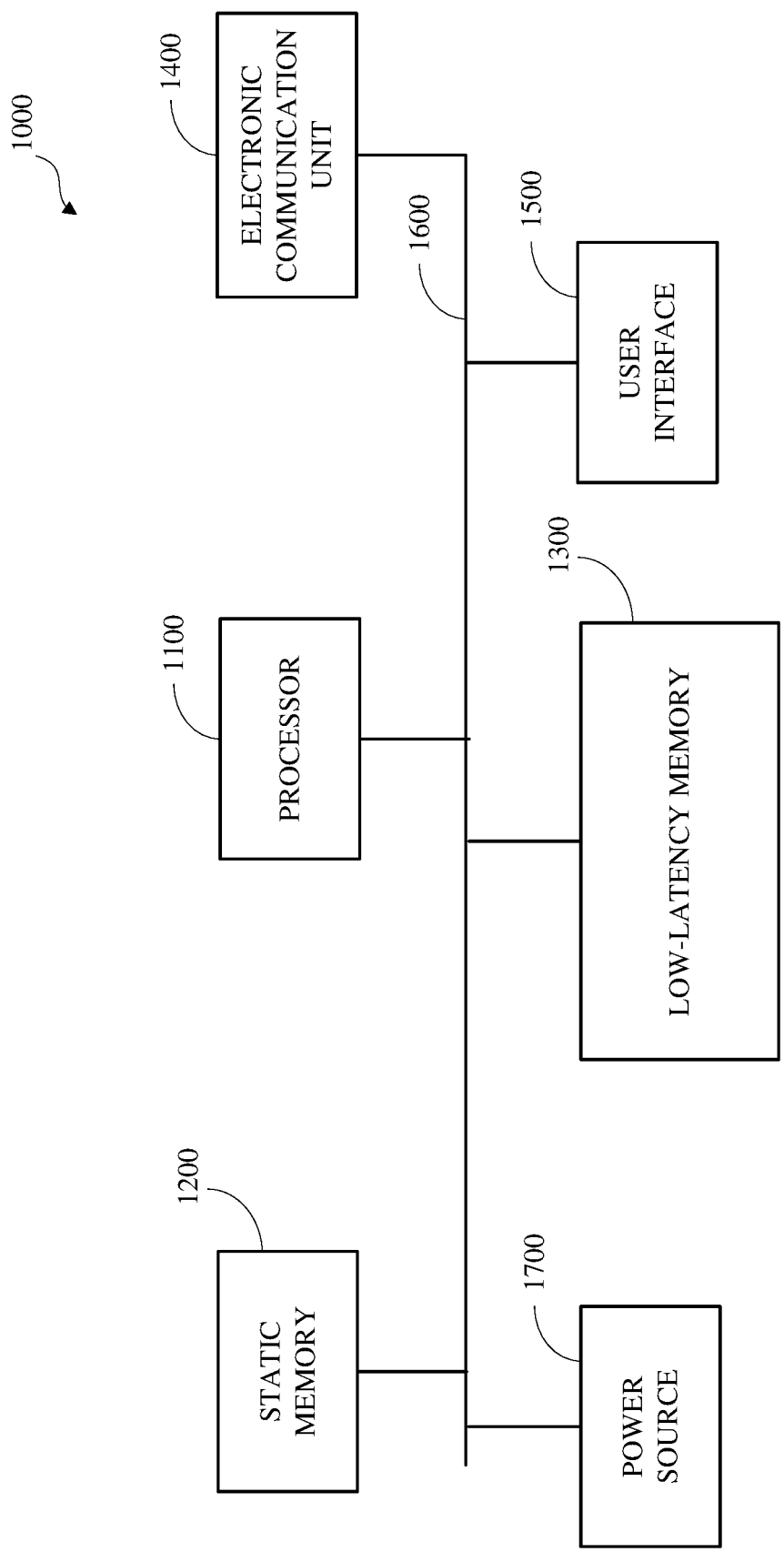
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems.

A low-latency database analysis system may improve on the efficiency and accessibility of data by respond to requests for data input by users with little or no knowledge of the underlying database schema or query languages used to access the underlying database. A low-latency database analysis system may improve on the efficiency and accessibility of data by using a cluster of in-memory database stores with a shared index that is designed to efficiently process high volumes of queries to provide low-latency responses. A low-latency database analysis system may improve on the efficiency and accessibility of data by importing the data from relatively slow external database systems, which are designed for transactional reliability rather than access performance and flexibility, into a low-latency in-memory internal database. Analysis of these large volumes of external data may require the external data to be cached in a local database. Importing the external data into the internal database may include schema management, extract, transform, load (ETL) pipeline setup and maintenance, management of the data volume, and the like. For some external data sources, importing data, or a portion thereof, may be unavailable or inefficient and the data may be unavailable to the low-latency database analysis system.

A low-latency database analysis system with external database interoperability may improve on the efficiency and accessibility of data by providing an interface for low-latency database access and analysis of data stored in the interval low-latency database stores and data stored in the external database. A low-latency database analysis system with external database interoperability may improve on the efficiency and accessibility of data by obtaining database schema, or data otherwise describing the external database, from the external database into the in-memory database, omitting importing the underlying data, or a portion thereof, from the external database, and the indexing relevant information from the external data sources in order to permit the use of low-latency database analysis query technology on the in-memory database store, the external data sources, or both.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
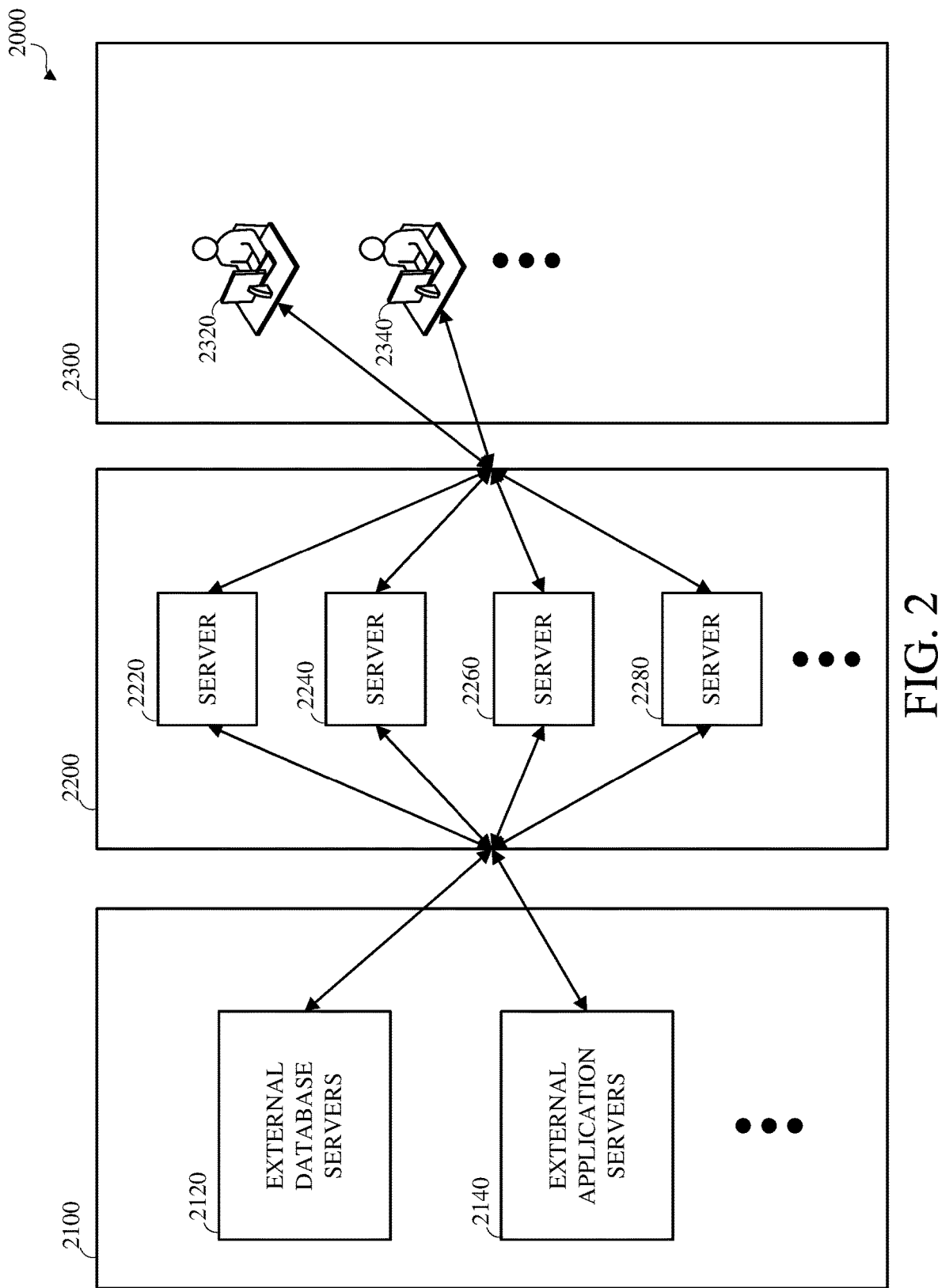
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
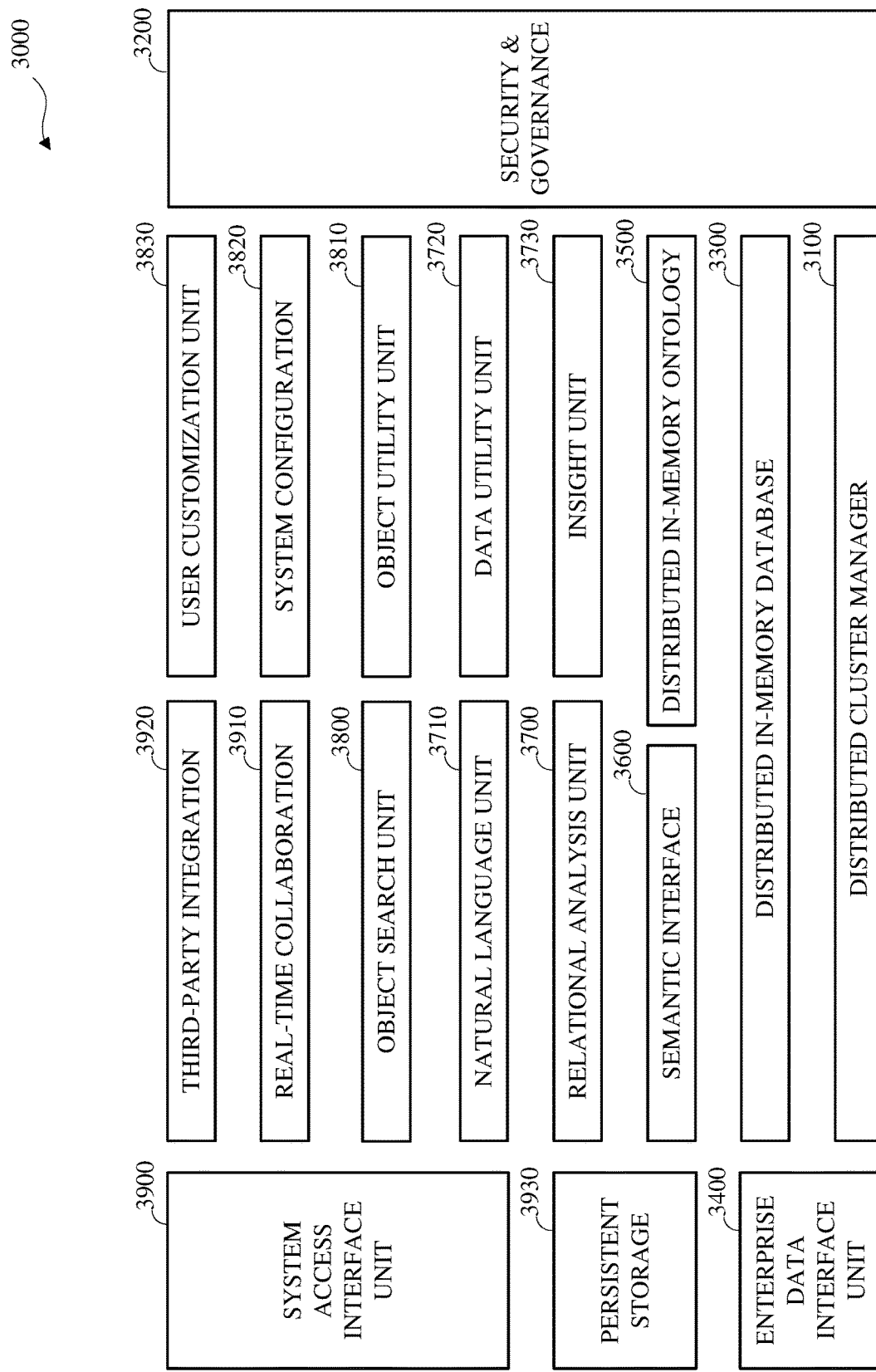
FIG. 3 is a block diagram of an example of a low-latency database analysis system.

FIG. 3 is a block diagram of an example of a low-latency database analysis system 3000. The low-latency database analysis system 3000, or aspects thereof, may be similar to the internal database analysis portion 2200 shown in FIG. 2, except as described herein or otherwise clear from context. The low-latency database analysis system 3000, or aspects thereof, may be implemented on one or more computing devices, such as servers 2220, 2240, 2260, and 2280 shown in FIG. 2, which may be in a clustered or distributed computing configuration.

The low-latency database analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency database analysis system 3000 may be implemented as one or more logical devices in a cloud-based configuration optimized for automatic database analysis.

As shown, the low-latency database analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency database analysis system 3000.

Although not expressly shown in FIG. 3, one or more of the components of the low-latency database analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency database analysis system 3000, or respective aspects thereof, may be combined or otherwise organized.

The low-latency database analysis system 3000 may include different, fewer, or additional components not shown in FIG. 3. The aspects or components implemented in an instance of the low-latency database analysis system 3000 may be configurable. For example, the insight unit 3730 may be omitted or disabled. One or more of the components of the low-latency database analysis system 3000 may be implemented in a manner such that aspects thereof are divided or combined into various executable modules or libraries in a manner which may differ from that described herein.

The low-latency database analysis system 3000 may implement an application programming interface (API), which may monitor, receive, or both, input signals or messages from external devices and systems, client systems, process received signals or messages, transmit corresponding signals or messages to one or more of the components of the low-latency database analysis system 3000, and output, such as transmit or send, output messages or signals to respective external devices or systems. The low-latency database analysis system 3000 may be implemented in a distributed computing configuration.

The distributed cluster manager 3100 manages the operative configuration of the low-latency database analysis system 3000. Managing the operative configuration of the low-latency database analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency database analysis system 3000, such as in one or more tables, identifying the operative configuration of the low-latency database analysis system 3000. For example, the distributed cluster manager 3100 may automatically update the low-latency database analysis system configuration data in response to an operative configuration event, such as a change in availability or performance for a physical or logical unit of the low-latency database analysis system 3000. One or more of the component units of low-latency database analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency database analysis system 3000, such as the internal data of the low-latency database analysis system 3000 and the features and interfaces of the low-latency database analysis system 3000. The security and governance unit 3200 may apply security at an ontological level to control or limit access to the internal data of the low-latency database analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency database analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency database analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data.

The distributed in-memory database 3300 may interpret, evaluate, or otherwise process a data-query to generate one or more distributed-queries, which maybe expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency database analysis system 3000. The enterprise data interface unit 3400 may receive, or otherwise access, the enterprise data from one or more external data sources, such as the external data source portion 2100 shown in FIG. 2, and may represent the enterprise data in the low-latency database analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency database analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, an insight, a pinboard, a tag, a comment, a trigger, a defined variable, a data source, an object-level security rule, a row-level security rule, or any other data capable of being distinctly identified and stored or otherwise obtained in the low-latency database analysis system 3000. An object may represent or correspond with a logical entity. Data describing an object may include data operatively or uniquely identifying data corresponding to, or represented by, the object in the low-latency database analysis system. For example, a column in a table in a database in the low-latency database analysis system may be represented in the low-latency database analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be a defined, such as previously generated, request for data, such as a resolved-request. An answer may include information describing a visualization of data responsive to the request for data.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

A context (context object) may be a set or collection of data associated with a request for data or a discretely related sequence or series of requests for data or other interactions with the low-latency database analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency database analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency database analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency database analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, and the like. Secondary objects may be referred to herein as analytical-objects.

Tertiary objects may be objects representing distinctly identifiable operative data units or structures representing operational aspects of the low-latency database analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node object can include one or more component objects. Component objects may be versioned, such as on a per-component object basis. For example, a node can include a header object, a content object, or both. A header object may include information about the node. A content may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency database analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency database analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency database analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency database analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement on or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency database analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency database analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency database analysis system 3000 as having one or more defined grammatical functions, which may be contextual. For example, the control-word index may include the control-word token "sum", which may be identified in one or more grammars of the low-latency database analysis system 3000 as indicating an additive aggregation. In another example, the control-word index may include the control-word token "top", which may be identified in one or more grammars of the low-latency database analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency database analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency database analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved request data, unresolved request data, or a combination of resolved request data and unresolved request data. The relational search unit 3700 may identify the resolved request data. The relational search unit 3700 may identify the unresolved request data and may tokenize the unresolved request data.

Resolved request data may be request data identified in the data expressing the usage intent as resolved request data. Each resolved request data portion may correspond with a respective token in the low-latency database analysis system 3000. The data expressing the usage intent may include information identifying one or more portions of the request data as resolved request data.

Unresolved request data may be request data identified in the data expressing the usage intent as unresolved request data, or request data for which the data expressing the usage intent omits information identifying the request data a resolved request data. Unresolved request data may include text or string data, which may include a character, sequence of characters, symbol, combination of symbols, word, sequence of words, phrase, or the like, for which information, such as tokenization binding data, identifying the text or string data as resolved request data is absent or omitted from the request data. The data expressing the usage intent may include information identifying one or more portions of the request data as unresolved request data. The data expressing the usage intent may omit information identifying whether one or more portions of the request data are resolved request data. The relational search unit 3700 may identify one or more portions of the request data for which the data expressing the usage intent omits information identifying whether the one or more portions of the request data are resolved request data as unresolved request data.

For example, the data expressing the usage intent may include a request string and one or more indications that one or more portions of the request string are resolved request data. One or more portions of the request string that are not identified as resolved request data in the data expressing the usage intent may be identified as unresolved request data. For example, the data expressing the usage intent may include the request string "example text"; the data expressing the usage intent may include information indicating that the first portion of the request string, "example", is resolved request data; and the data expressing the usage intent may omit information indicating that the second portion of the request string, "text", is resolved request data.

The information identifying one or more portions of the request data as resolved request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined relational search grammar or a tokenizer for a natural-language grammar. For example, the relational search unit 3700 may implement one or more of a formula tokenizer, a row-level-security tokenizer, a relational search tokenizer, or a natural language tokenizer. Other tokenizers may be used. In some implementations, the relational search unit 3700 may implement one or more of the grammar-specific tokenizers, or a portion thereof, by accessing another component of the low-latency database analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the relational search tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency database analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the define data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore=FSMScore*(IndexScore+ UBRScore*UBRBoost)+Min\ (CardinalityScore, 1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the relational search grammar and the natural language search grammar, are described with relation to the canonical expressive-form, the implementation of the respective grammars, or portions thereof, described herein may implement locale-specific expressive-forms. For example, the relational search tokenizer may include multiple locale-specific relational search tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency database analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency database analysis system 3000, or both, for at least a portion of the natural language string. For example, the natural language processing unit 3710 may identify one or more words or terms in the natural language string and may correlate the identified words to tokens defined in the low-latency database analysis system 3000. In another example, the natural language processing unit 3710 may identify a semantic structure for the natural language string, or a portion thereof In another example, the natural language processing unit 3710 may identify a probabilistic intent for the natural language string, or a portion thereof, which may correspond to an operative feature of the low-latency database analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency database analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency database analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency database analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency database analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency database analysis system 3000, or in a defined data-domain within the low-latency database analysis system 3000. The low-latency database analysis system 3000 may uniquely, unambiguously, distinguish an object from other objects based on the object identifier associated with the object. The object indexing data for an analytical-object may include data non-uniquely identifying the object. The low-latency database analysis system 3000 may identify one or more analytical-objects based on the non-uniquely identifying data associated with the respective objects, or one or more portions thereof In some implementations, an object identifier may be an ordered combination of non-uniquely identifying object data that, as expressed in the ordered combination, is uniquely identifying. The low-latency database analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency database analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency database analysis system 3000, which may represent a request to access data in the low-latency database analysis system 3000, which may represent a request to access one or more analytical-objects represented in the low-latency database analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency database analysis system 3000, such as for further processing and display to the user.

The object utility unit 3810 may receive, process, and maintain user-specific object utility data for objects represented in the low-latency database analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit

3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency database analysis system configurations to enable, disable, or configure one or more operative features of the low-latency database analysis system 3000. The system configuration unit 3820 may store data representing or defining the one or more low-latency database analysis system configurations. The system configuration unit 3820 may receive signals or messages indicating input data, such as input data generated via a system access interface, such as a user interface, for accessing or modifying the low-latency database analysis system configurations. The system configuration unit 3820 may generate, modify, delete, or otherwise maintain the low-latency database analysis system configurations, such as in response to the input data. The system configuration unit 3820 may generate or determine output data, and may output the output data, for a system access interface, or a portion or portions thereof, for the low-latency database analysis system configurations, such as for presenting a user interface for the low-latency database analysis system configurations. Although not shown in FIG. 3, the system configuration unit 3820 may communicate with a repository, such as an external centralized repository, of low-latency database analysis system configurations; the system configuration unit 3820 may receive one or more low-latency database analysis system configurations from the repository, and may control or configure one or more operative features of the low-latency database analysis system 3000 in response to receiving one or more low-latency database analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, an insight, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user customization unit 3830 may store the feedback at an individual level and may include the context in which feedback was received from the user. Feedback may be stored in a disk-based system. In some implementations, feedback may be stored in an in-memory storage.

The system access interface unit 3900 may interface with, or communicate with, a system access unit (not shown in FIG. 3), which may be a client device, a user device, or another external device or system, or a combination thereof, to provide access to the internal data, features of the low-latency database analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency database analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a search field user interface element in the user interface. The search field user interface element may be an unstructured search string user input element or field. The system access unit may display the unstructured search string user input element. The system access unit may receive input data, such as user input data, corresponding to the unstructured search string user input element. The system access unit may transmit, or otherwise make available, the unstructured search string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured search string, from the system access unit. The system access interface unit 3900 may transmit, or otherwise make available, the user input data to one or more of the other components of the low-latency database analysis system 3000.

In some embodiments, the system access interface unit 3900 may obtain the unstructured search string user input as a sequence of individual characters or symbols, and the system access interface unit 3900 may sequentially transmit, or otherwise make available, individual or groups of characters or symbols of the user input data to one or more of the other components of the low-latency database analysis system 3000.

In some embodiments, system access interface unit 3900 may obtain the unstructured search string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency database analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency database analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency database analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency database analysis system 3000. For example, the third-party integration unit 3920 may include an electronic communication interface to transfer data between the low-latency database analysis system 3000 and one or more external applications or systems, such as by importing data into the low-latency database analysis system 3000 from the external applications or systems or exporting data from the low-latency database analysis system 3000 to the external applications or systems. For example, the third-party integration unit 3920 may include an electronic communication interface for electronic communication with an external exchange, transfer, load (ETL) system, which may import data into the low-latency database analysis system 3000 from an external data source or may export data from the low-latency database analysis system 3000 to an external data repository. In another example, the third-party integration unit 3920 may include an electronic communication interface for electronic communication with external machine learning analysis software, which may export data from the low-latency database analysis system 3000 to the external machine learning analysis software and may import data into the low-latency database analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency database analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency database analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency database analysis system 3000. In another example, the persistent storage unit 3930 may include a first external interface for storing data on, or obtaining data from, a first external persistent storage system, and a second external interface for storing data on, or obtaining data from, a second external persistent storage system.

The low-latency database analysis system 3000 may import and cache existing data into the distributed in-memory database 3300 for analysis. Importing data into the distributed in-memory database 3300 may have its own challenges including, but not limited to, in-memory database schema management, ETL pipeline setup and maintenance, management of the data volume, or the like. These challenges may add significant time for the setup to complete and may increase the overall time for deployment to analysis. The low-latency database analysis system 3000 may be configured to access and utilize an external data source directly.

In an example, the low-latency database analysis system 3000 may operate without having to cache data in the distributed in-memory database 3300. Data may remain in an external data source, for example external database servers 2120 shown in FIG. 2, and may be queried at runtime. The distributed in-memory database 3300 may be configured to store schema, user uploaded data, internal tables, or any combination thereof. In another example, the low-latency database analysis system 3000 may operate with prioritized data cached in the distributed in-memory database 3300. Some prioritized data may be cached in the distributed in-memory database 3300, and the residual data may remain in the external database servers 2120. The external database servers 2120 may be queried in accordance with operations.

The low-latency database analysis system 3000 may connect to any external data source to access relational database sources. Example external data sources include, and are not limited to, RedShift, structured query language server, Snowflake, or the like. The low-latency database analysis system 3000 may convert a low-latency database analysis system query to an external data source. Access may be via a defined database query language, such as structured query language or dialect neutral. The low-latency database analysis system 3000 may be configured to fetch and synchronize data from the external database servers 2120. Metadata such as columns and relationships from the underlying connection may be synchronized. The low-latency database analysis system 3000 may be configured to generate and transmit notifications for metadata and data changes that occur on the external database servers 2120 to update the search metadata and data. The notifications may be generated and transmitted in real time. Distributed execution may be performed on the low-latency database analysis system 3000, the external database servers 2120, or any combination thereof In an example, the distributed in-memory database 3300 of the low-latency database analysis system 3000 may be utilized as cache.

A query may be executed on a logical instance of a database type, for example the distributed in-memory database 3300 or the external data source 210. Modification of the external database servers 2120, both metadata and data, may be performed by the low-latency database analysis system 3000. Any change to the logical model (e.g. addition of relationships) may not be propagated to the external database servers 2120.

Initial setup of the connection for the external database servers 2120 may include establishing connection semantics utilized for establishing the connection. These parameters may be based on each different type of database being accessed.

The low-latency database analysis system 3000 may generate and display a list of available external data source types. The low-latency database analysis system 3000 may be configured to receive an input that indicates any one of the external data source types to initiate the connection to the database. The semantic interface 3600 may be configured to generate a list of external data source types and transmit the list through a semantic interface API.

The low-latency database analysis system 3000 may be configured to receive one or more connection attributes for a selected database type to create a connection to that database. The low-latency database analysis system 3000 may generate and display a list of objects that exist in the external database servers 2120 in a hierarchical format. The objects may include a database, a schema, a table, and columns. Once a connection is created, it may be modified or deleted. When deleting an external data source connection, all the metadata and data imported from it may be deleted from the low-latency database analysis system 3000.

A cache setting may be used to indicate whether the data of the object is to be cached into the distributed in-memory database 3300 database. This cache setting may be applied at any object level. If the cache setting is directed to at a higher-level object, then the cache setting may be automatically applied to all the objects in hierarchically adjacent lower levels. For example, if the cache setting is applied to a database, by default all the schemas, tables, and columns inside that database will be selected for caching in the distributed in-memory database 3300. Any object caching may be overridden or uncached. In an example, if a column is cached, the indexing data generated for it may be from the cached data. If the column is not cached, then the indexes may be generated on data from the external database servers 2120 up to a configurable row limit. If a column is cached, a filter condition may be specified that defines the prioritized data. The filter condition may be used to read and cache data into the distributed in-memory database 3300. The filter condition may be a valid clause that can be used in the target table column data fetch defined database query language, such as structured query language, for query execution. For example, the data fetch queries for the columns with filter values specified may be: Select*from <column> where <filter_condition> limit <row_limit>.

Once all the metadata and additional attributes have been selected, the import of metadata and data may begin. The importing may be performed in the background. Importing may include fetching schema, based on a request, from the external database servers 2120. After the schema has been created, a data load may be scheduled to load data from external database servers 2120 to the distributed in-memory database 3300. Any appropriate filters may be applied to the query to fetch the prioritized data. The data load may be performed in the background.

For simplicity, the handling of schema from the external database servers 2120 may consider the following objects from the source database schema: table, column, primary key-foreign key (PK-FK) relationship, and generic relationship (if supported). PK-FK joins between tables that are imported may automatically be read, and the same joins may be created in the logical layer. The data types supported by the external database servers 2120 may be restricted to the datatypes supported by the distributed in-memory database 3300. The supported datatypes may include, and are not limited to: Boolean, Int32, Float, Double, Int64, Date, Datetime, Time, Bigint, and Varchar. The appropriate data type conversion in such cases may be performed by an external data source manager service.

In an example, the distributed in-memory database 3300 may be accessed by the semantic interface 3600 and the relational search unit 3700. The semantic interface 3600 may be configured to fetch physical metadata from the distributed in-memory database 3300. The semantic interface 3600 may prepare a logical metadata model from the physical metadata. The semantic interface 3600 may monitor the distributed in-memory database 3300 for schema changes. The database access layer may be an interface that provides connectivity and access to a lower level physical database storage. This interface may provide functionality to obtain and synchronize physical schema, data, or both, and to execute queries on the source database. The database access layer will implement one or more interfaces, for example, an external data source load manager such as a DataLoadManager configured to perform data operations with the external database server 2120, an external data source manager client such as a client for the LinkedDBManager service, and an external data source compute unit client.

The relational search unit 3700 may be configured to issue data queries against the distributed in-memory database 3300 to read the data values and prepare data tokens from the data values. The relational search unit 3700 may be configured to monitor the distributed in-memory database 3300 for data changes. The relational search unit 3700 may be configured to monitor the semantic interface 3600 logical metadata. The relational search unit 3700 may monitor the distributed cluster manager 3100 for data notifications. The distributed cluster manager 3100 may be updated by the individual database managing services, i.e. the in-memory database manager and the external data source manager. Upon receiving the data change notification, the relational search unit 3700 may fetch the column data values. The relational search unit 3700 may issue read requests for column data to the semantic interface 3600. These read requests may be redirected to the appropriate database (i.e., the distributed in-memory database 3300 or the external database servers 2120) to write data to a Hadoop Distributed File System (HDFS). The relational search unit 3700 may use a data fetch API. The data fetch API may fetch data for the specified logical table and column. The data fetch API may include a row limit parameter that specifies the limit on the number of rows that will be returned for the column. The data fetch API may include a sample parameter that indicates whether the data values should be sampled. The data fetch API may include an HDFS file parameter that indicates the HDFS path of the file where the serialized data will be written.

In an embodiment, direct access to the distributed in-memory database 3300 may be restricted from all the components except for the semantic interface 3600. Any other component that utilizes access to the distributed in-memory database 3300 may issue a request to obtain a response from the semantic interface 3600.

Figure 4:
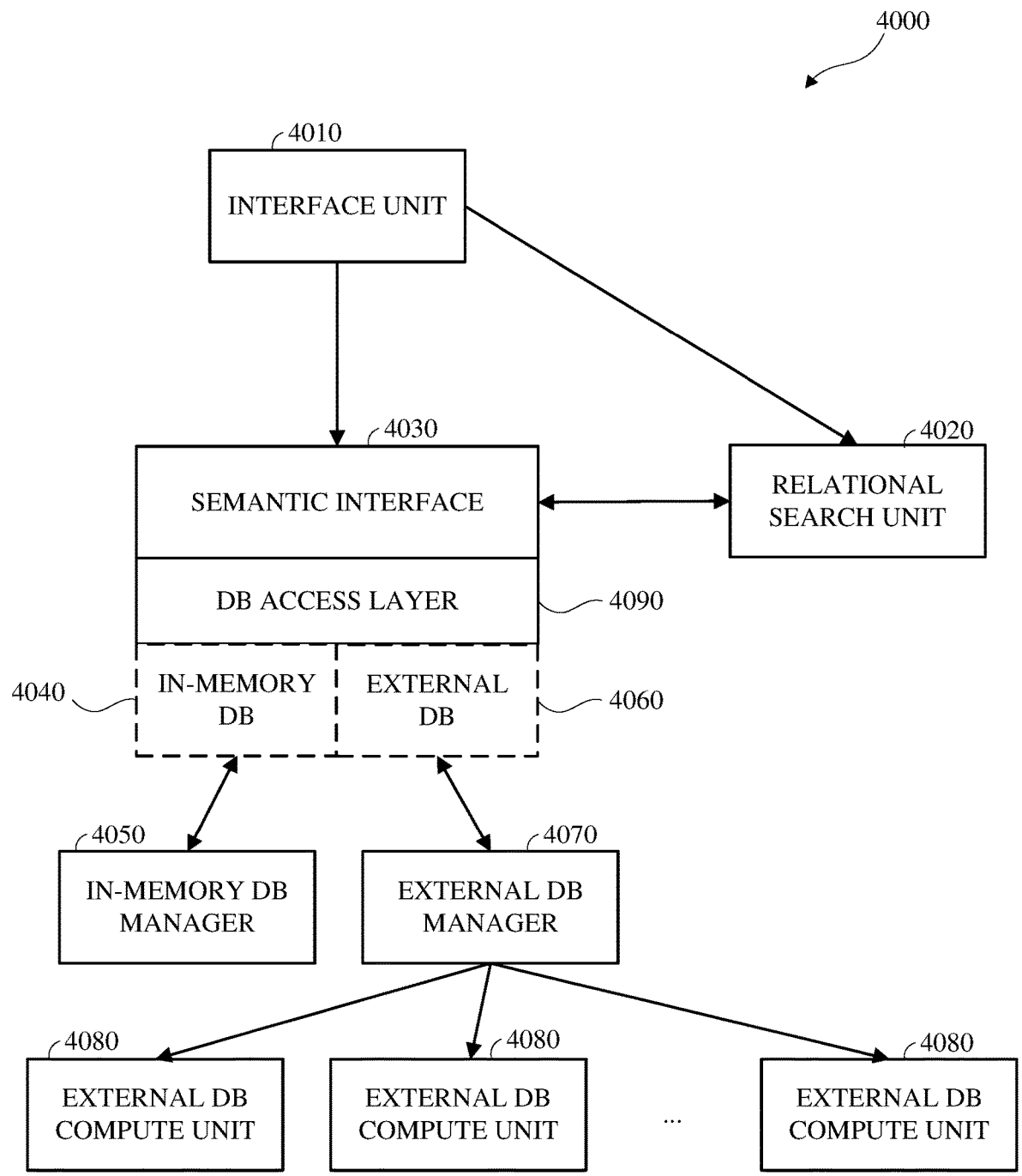
FIG. 4 is a block diagram of an example of a low-latency database analysis system for low-latency database analysis using external data sources in accordance with this disclosure.

FIG. 4 is a block diagram of an example of a low-latency database analysis system 4000 for low-latency database analysis using external data sources in accordance with this disclosure. The low-latency database analysis system 4000 includes an interface unit 4010, such as the system access interface unit 3900 shown in FIG. 3. The low-latency database analysis system 4000 includes a relational search unit 4020, such as the relational search unit 3700 shown in FIG. 3. The low-latency database analysis system 4000 includes a semantic interface 4030, such as the semantic interface 3600 shown in FIG. 3. The low-latency database analysis system 4000 includes an in-memory database 4040, such as the distributed in-memory database 3300 shown in FIG. 3. The low-latency database analysis system 4000 includes an in-memory database manager 4050, an external database 4060, an external-database manager 4070, one or more external database compute units 4080, and a database access layer 4090. An example of an external database 4060 may include the external database servers 2120 shown in FIG. 2.

The database access layer 4090 may be an interface that provides the semantic interface 4030 connectivity and access to a data source, for example the in-memory database 4040, the external database 4060, or both. The in-memory database manager 4050 may transmit a data change notification to a distributed cluster manager, such as distributed cluster manager 3100 shown in FIG. 3. The physical schema created in the in-memory database 4040 from the external database 4060 may be stored using the same structural hierarchy as defined in the external database 4060. Storing the physical schema in this manner may aid in managing one-to-one relationships between the external database tables and the in-memory database tables.

The external-database manager 4070 and the external database compute units 4080 may be configured to coordinate external database operations. The external-database manager 4070 and the external database compute units 4080 may be configured to access external databases. The services provided by the external database manager 4070 and the external database compute units 4080 may be similar to in-memory database manager services and in-memory database compute unit services except that the external database manager services and the external database compute unit services may be configured to perform as a broker for the database access rather than being database services themselves.

In an example, separate services may be used to manage the external data source interactions. Separate services may may be used to keep the linked dependencies that are implementation specific to the external data source separate from the mainline code, enable the system to scale up or scale down independent of the low-latency database analysis system services, prevent the semantic interface from getting overloaded with excess functionality, or any combination thereof.

An external data source manager (EDSM), such as external-database manager 4070, may be a single service unit running in the cluster. The EDSM may be the initial starting point for external data source accesses. The EDSM may provide connectivity information for the external database 4060. This may include the attributes utilized to establish a connection the external database 4060. This information may be requested by the semantic interface 4030 when setting up the external data source access the first time. The EDSM may provide connect and disconnect functionality to establish and maintain one or more connections to the external database 4060. The connection credentials may be passed to the EDSM by the semantic interface 4030. The EDSM may fetch metadata and data from the external data source 4060 and convert it into a format that the semantic interface 4030 supports. The EDSM may generate queries that can be executed on the external database 4060 from the low-latency database analysis system.

A unique identifier may be used to identify the external database 4060. An instance may identify the schema objects selected by the user that are to be monitored for changes. A monitor may be configured to monitor an external data source schema to determine schema change notifications. For example, in response to a detection of a schema change in the external database 4060, the external-database manager 4070 may be updated. The external-database manager 4070 may be configured to read data from a node, for example one or more of the external database compute units 4080, and may update the contents with the changes. The changes may be reported by incrementing the schema version for the table whose data has changed.

A monitor may be configured to monitor data of the external database 4060 to determine data change notifications. For example, in response to a detection of a data change in the external database 4060, the external-database manager 4070 may be updated. The external-database manager 4070 may be configured to read data from a node, for example one or more of the external database compute units 4080, and may update the contents with the changes. The changes may be reported by incrementing the data version for the table whose data has changed.

A proto-query may be executed on the external database 4060. The proto-query may be converted into the underlying defined database query language, such as structured query language. The result may be in a second proto-query. A table may be created in the external database 4060. Data may be loaded to a table in the external database 4060. A table may be deleted in the external database 4060.

The external database compute units 4080 may be configured to execute the queries on the target database. The external database compute units 4080 may be distributed to provide query execution scalability. The external database compute units 4080 may be configured to generate and execute queries on the external database 4060 from the low-latency database analysis system.

The metadata utilized for these services may be stored in one or more tables. These tables may be read by both the external-database manager 4070 and the external database compute units 4080 to fetch and store any metadata details for their operation. An example table for holding the metadata may include a database config table. The database config table may hold the connection configuration to establish a successful connection to the external database 4060. The username and password may be stored in encrypted format.

As the access to the external database 4060 is managed by multiple entities, the semantic interface 4030 may have no knowledge about the connection semantics to the external database 4060. In addition, from the perspective of the semantic interface 4030, the connection to the external database 4060 may be stateless or thread safe and could be used in parallel through multiple concurrent user accesses. Accordingly, the entities may provide a pool of connections that may be used to connect to the external database 4060. The implementations disclosed herein may not be tied to a particular connection opened with the external database 4060. In an example, the component may use Query and Result caching. The low-latency database analysis system 4000 may be configured to operate with Unicode Transformation Format 8-bit (UTF-8) encoding. In an example, the external database compute units 4080 may determine that the data is correctly encoded in UTF-8 before transmitting it to any other low-latency database analysis system services.

The low-latency database analysis system 4000 is configured to search both prioritized data that is cached in the in-memory database 4040 and non-prioritized data that is in the external database 4060. Accordingly, the low-latency database analysis system 4000 may be configured to seamlessly search in and switch between these two data sets.

Figure 5:
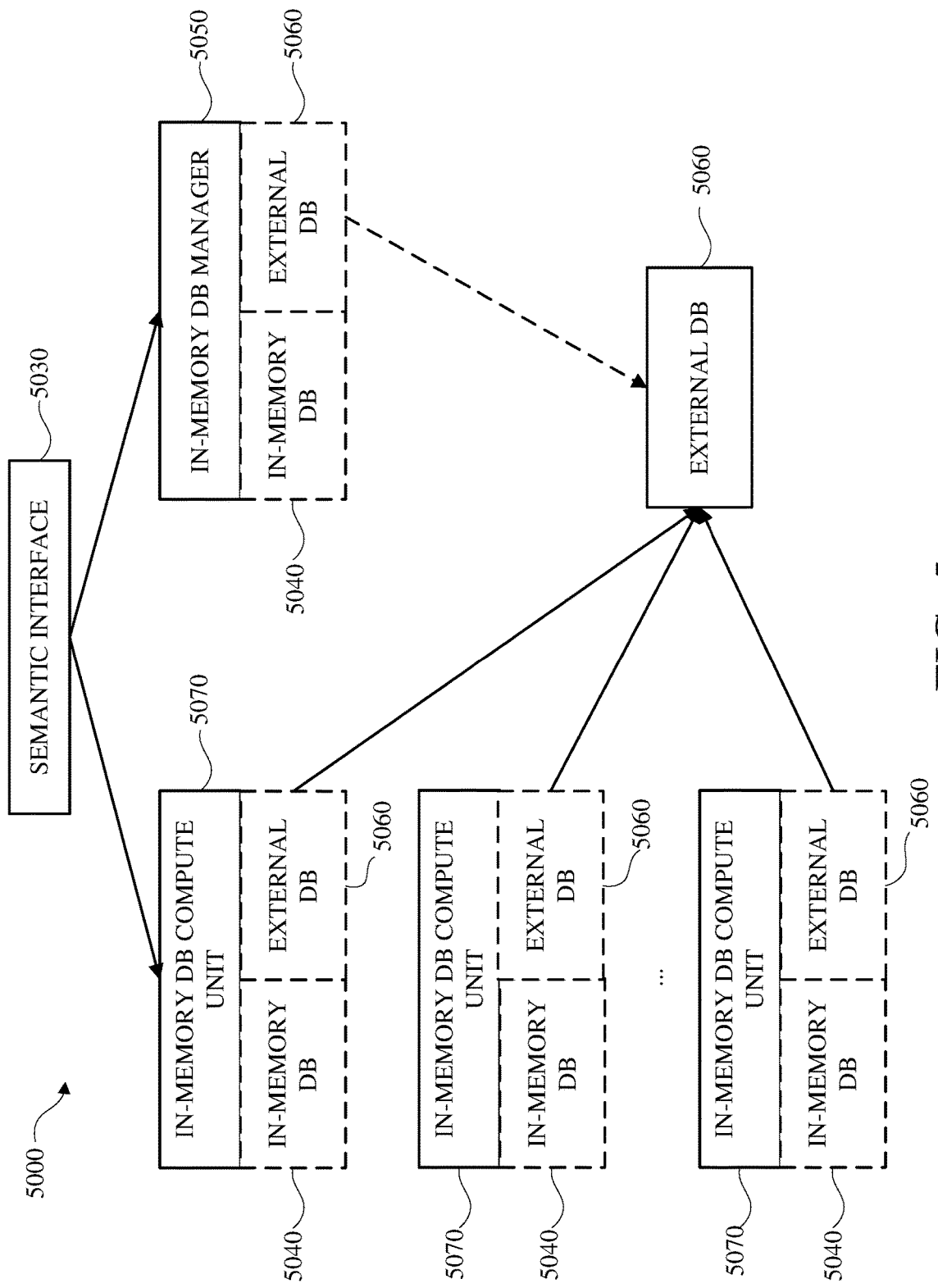
FIG. 5 is a block diagram of another example of a low-latency database analysis system for low-latency database analysis using external data sources in accordance with this disclosure.

FIG. 5 is a block diagram of another example of a low-latency database analysis system 5000 for low-latency database analysis using external data sources in accordance with this disclosure. The low-latency database analysis system 5000 includes a semantic interface 5030 and an in-memory database 5040, for example distributed in-memory database 3300 shown in FIG. 3. The low-latency database analysis system 5000 includes a semantic interface 5050. The low-latency database analysis system 5000 includes an external database 5060 and one or more in-memory database compute units 5070. An example of an external database 5060 may include the external database servers 2120 shown in FIG. 2. Each of the in-memory database compute units 5070 may be in communication with the in-memory database 5040, the external database 5060, or both. In this example, the external database 5060 access may be performed directly by the in-memory database 5040. The semantic interface 5050 may be configured to fetch and maintain the schema from the external database 5060. The semantic interface 5050 may be configured to manage the schema and data notifications. The in-memory database compute units 5070 may be configured to perform query splitting and execution.

The in-memory database manager 5050 and the in-memory database compute units 5070 may be configured to coordinate and access points for external database 5060 operations. These services may be similar to the external database manager services and the external database compute unit services except that they may be configured to perform as database services themselves rather than as a broker for the actual database access.

In an example, separate services may be used to manage the external data source interactions. Separate services may may be used to keep the linked dependencies that are implementation specific to the external data source separate from the mainline code, enable the system to scale up or scale down independent of the low-latency database analysis system services, prevent the semantic interface from getting overloaded with excess functionality, or any combination thereof.

The in-memory database manager 5050 may be a single service unit running in the cluster. The in-memory database manager 5050 may be the initial starting point for in-memory data source accesses. The in-memory database manager 5050 may provide connectivity information for the in-memory data source, such as in-memory database 5040. This may include the attributes utilized to establish a connection to the in-memory database 5040. This information may be requested by the semantic interface 5030 when setting up the external database 5060 access the first time. The in-memory database manager 5050 may provide connect and disconnect functionality to establish and maintain one or more connections to the external database 5060. The connection credentials may be transmitted to the in-memory database manager 5050 by the semantic interface 5030. The in-memory database manager 5050 may fetch metadata and data from the external database 5060 and convert the metadata and data into a format that the semantic interface 5030 supports. The in-memory database manager 5050 may generate queries that can be executed on the external database 5060 from the low-latency database analysis system 5000.

A unique identifier may be used to identify the external database 5060. An instance may identify the schema objects selected by the user that are to be monitored for changes. A monitor may be configured to monitor an external data source schema to determine schema change notifications. For example, in response to a detection of a schema change in the external database 5060, the in-memory database manager 5050 may be updated. The in-memory database manager 5050 may be configured to read data from a node, for example one or more in-memory database compute units 5070 and may update the contents with the changes. The changes may be reported by incrementing the schema version for the table whose data has changed.

A monitor may be configured to monitor data of the external database 5060 to determine data change notifications. For example, in response to a detection of a data change in the external database 5060, the in-memory database manager 5050 may be updated. The in-memory database manager 5050 may be configured to read data from a node, for example one or more in-memory compute units 5070, and may update the contents with the changes. The changes may be reported by incrementing the data version for the table whose data has changed.

A proto-query may be executed on the external database 5060. The proto-query may be converted into the underlying defined database query language, such as structured query language. The result may be in a second proto-query. A table may be created in the external database 5060. Data may be loaded to a table in the external database 5060. A table may be deleted in the external database 5060.

The in-memory database compute units 5070 may be configured to execute the queries on the target database. The in-memory database compute units 5070 may be distributed to provide query execution scalability. The in-memory database compute units 5070 may be configured to generate and execute queries on the external database 5060 from the low-latency database analysis system 5000.

The metadata utilized for these services may be stored in one or more tables. These tables may be read by both the in-memory database manager 5050 and in-memory database compute units 5070 to fetch and store any metadata details for their operation. An example table for holding the metadata may include a database config table. The database config table may hold the connection configuration to establish a successful connection to the external database 5060. A username and password may be stored in encrypted format.

As the access to the external database 5060 may be managed by multiple entities, the semantic interface 5030 may have no knowledge about the connection semantics to the external database 5060. In addition, from the perspective of the semantic interface 5030, the connection to external database 5060 may be stateless or thread safe and could be used in parallel through multiple concurrent user accesses. Accordingly, the services may provide a pool of connections that may be used to connect to the external database 5060. The implementations disclosed herein may not be tied to a particular connection opened with the external database 5060. In an example, the component may use Query and Result caching. The low-latency database analysis system 5000 may be configured to operate with UTF-8 encoding. In an example, the in-memory compute units 5070 may determine that the data is correctly encoded in UTF-8 before transmitting the data to any other low-latency database analysis system services.

The low-latency database analysis system 5000 is configured to search both prioritized data that is cached in the in-memory database 5040 and non-prioritized data that is in the external database 5060. Accordingly, the low-latency database analysis system 5000 may be configured to seamlessly search in and switch between these two data sets.

Figure 6:
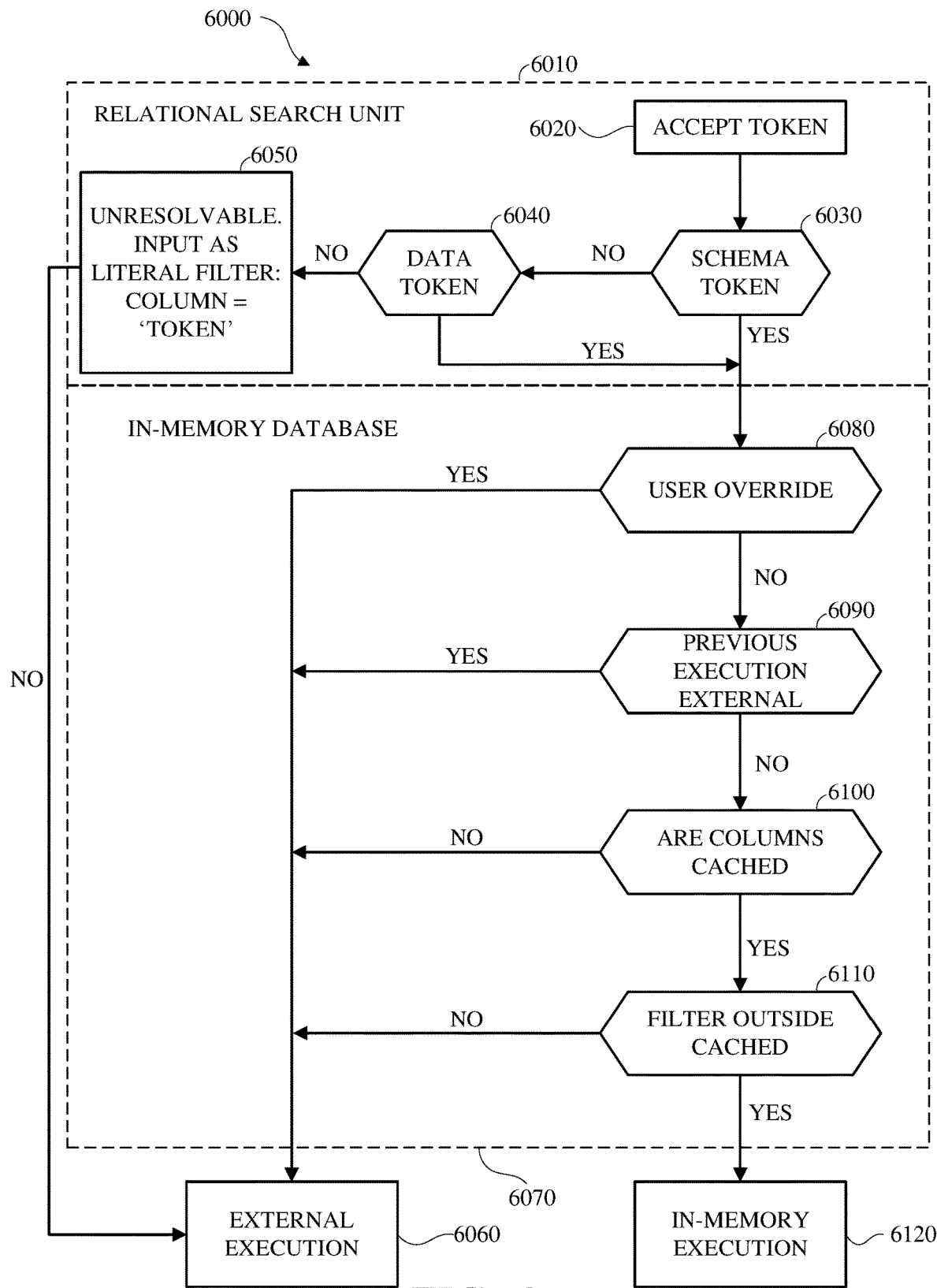
FIG. 6 is a flow diagram of an example of a low-latency database analysis method using external data sources in accordance with this disclosure.

FIG. 6 is a flow diagram of an example of a low-latency database analysis method 6000 using external data sources in accordance with this disclosure. As shown in FIG. 6, a relational search unit 6010 is configured to accept a token 6020. The relational search unit 6010 determines 6030 whether the token is a schema token. If it is determined that the token is not a schema token, the relational search unit 6010 determines 6040 whether the token is a data token. If it is determined that the token is not a data token, then an error notification may be generated and transmitted to the user as the token is deemed unresolvable 6050. The query may be modified to a filter format based on a user input and the query may be processed for external execution 6060.

If the relational search unit 6010 determines 6030 that the token is a schema token, the in-memory database 6070 determines 6080 whether there is a user override for the query execution mode. This mode may be saved in a user profile and may continue to have the same setting unless changed. If the override is selected, the queries may be executed in the external data source 6060. If it is determined that there is no user override, the in-memory database determines 6090 whether there was a previous external execution. The previous query execution in this context may refer to the execution of the same query that may have been edited. If this is a previously unidentified query without prior execution, then the answer is determined to be a NO. If an external execution was previously performed, then the low-latency database analysis system will perform an external execution 6060. If there was no previous external execution, the in-memory database 6070 determines 6100 whether the columns are cached. If the columns are not cached, then the low-latency database analysis system will perform an external execution 6060. If the columns are determined to be cached, the in-memory database 6070 determines 6110 whether the external data is cached. For example, based on the query filters, if it can be inferred that the query would end up referring to data outside the cached data set, then the query will be executed in external data source 6060. If it can be inferred that the query would end up referring to data in the cached data set, then the query will be executed in in-memory database 6120.

Figure 7:
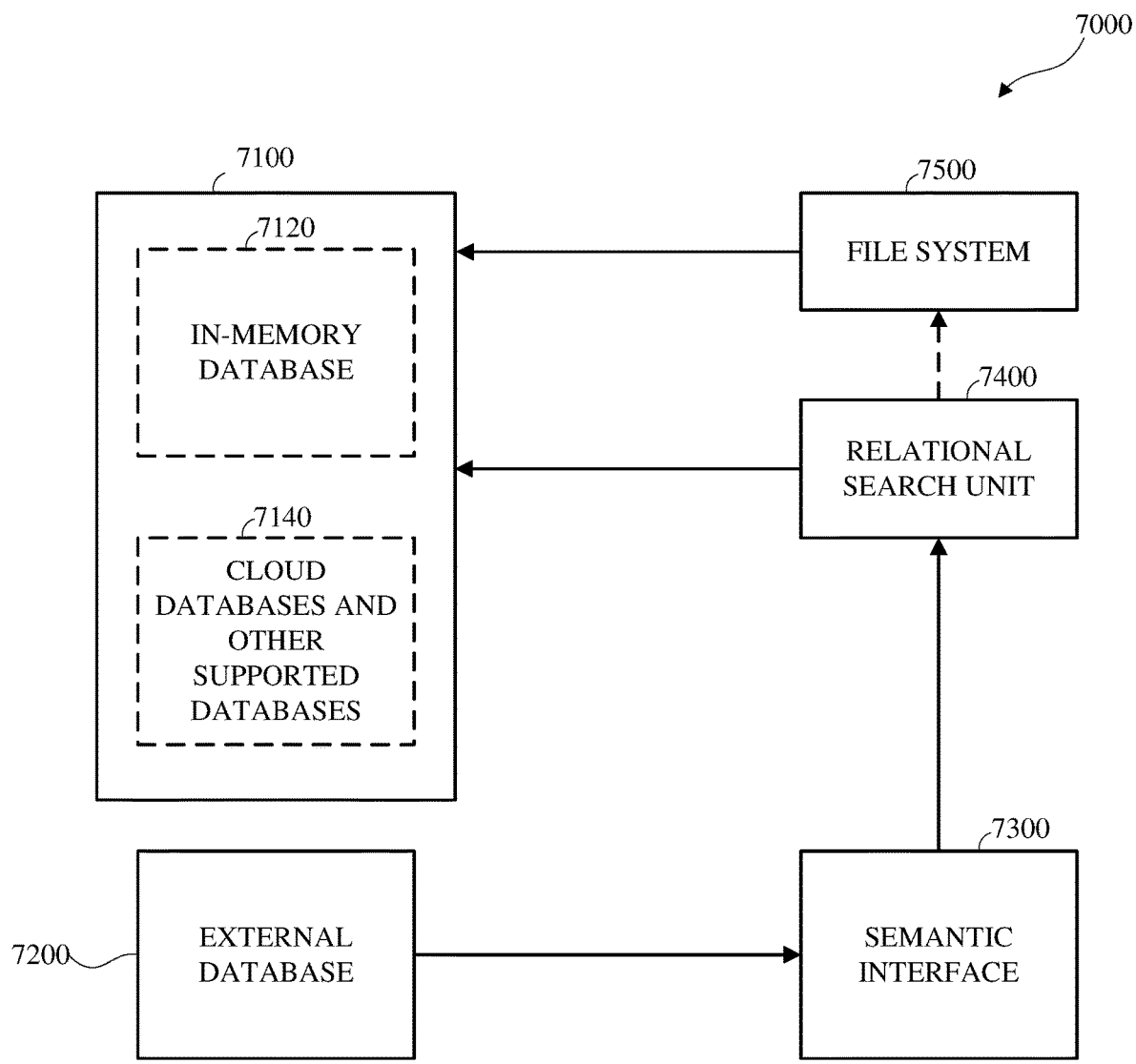
FIG. 7 is a block diagram of an example of a low-latency database analysis system for low-latency database analysis using external data sources in accordance with this disclosure.

FIG. 7 is a block diagram of an example of a low-latency database analysis system 7000 for low-latency database analysis using external data sources in accordance with this disclosure. The low-latency database analysis system 7000 includes a data service 7100, and may operate with an external database 7200, a semantic interface 7300, a relational search unit 7400, and a file system 7500. The data service 7100 includes an in-memory database 7120 and one or more supported databases 7140. The data service 7100 may be configured to provide an abstraction to the relational search unit 7400 from the database layer from which data to be indexed is fetched. The information regarding the data and the cardinality of a particular column may be provided by the data service 7100. The data service 7100 may be configured to generate a query for a column to be executed against a database, for example, the in-memory database 7120, the external database 7200, or both. Metadata may be imported from the external database 7200 to the semantic interface 7300. The semantic interface 7300 may transmit the metadata schema to the relational search engine 7400 for indexing. The relational search unit 7400 may transmit a request to the data service 7100 to obtain data. The data service 7100 may be configured to fetch the data and write the data to the file system 7500 for an external database, such as external database 7200. The file written to the file system 7500 may be in any file format, for example an HDFS file format. Once the file is written, the relational search unit 7400 may read the file to obtain the data values.

The data service 7100 may be configured to generate a proto-query based on the configuration of a visualization. A set of transformations may be applied to the proto-query such that the final query is based on physical entities i.e. table, columns, or the like. Once the final query is generated, the query may be serialized to a database specific query language. To support external database 7200, an external database specific serializer may be coded.

With each valid query received, the low-latency database analysis system 7000 may issue a query to the in-memory database 7120 to fetch the result. When a new token to the query is added, the new query may be issued to the in-memory database 7120 and the old query that is not yet executed may be canceled. This is possible because each query issued to the in-memory database 7120 is configured with a unique identifier and the in-memory database 7120 includes a mechanism to cancel a currently queued or executing query.

The data service 7100 may be configured to execute a query against the external database 7200. The data service 7100 may be configured to cache the query result with an appropriate time to live (TTL) value. The TTL value may be configurable and may start with a default value of 24 hours. Since the query form is in a defined database query language, such as structured query language, the data service 7100 may be configured to hash the query string by removing the aliases to compare query results. Other dynamic attributes, such as data source configurations, may be included while creating the hash of a query string. In an example, before sending the query to the external database 7200, the data service 7100 may first perform a cache lookup. If the result of the cache lookup is unavailable, the data service 7100 may issue the query to the external database 7200.

A defined database query language, such as structured query language, may be utilized by the external database query language, the external-database manager 4070 shown in FIG. 4, or both, for successful conversion between the low-latency database analysis system query and the target database. In cases where the external database 7200 does not support appropriate constructs, the external-database manager 4070 may implement alternative solutions.

Ephemeral temporary tables may be supported in the external database 7200. The temporary tables could be used to upload temporary data to the external database 7200 for query executions. The temporary tables may be associated with the connection and may not be accessible to entities outside the connection, the temporary tables may be automatically deleted on a connection disconnect or end of transaction.

In cases where complex functionality cannot be directly represented in a defined database query language, a query in the target database may include user defined functions (UDF)s to implement the functionality. The external database 7200 may receive an initialization script to configure the external database 7200 for a first time use. The initialization script may perform the operations for integration with the low-latency database analysis system 7000. The script may include computer readable program code configured to cause a processor to create a low-latency database analysis system specific user account for access from the low-latency database analysis system 7000. The script may include computer readable program code configured to cause a processor to create a database specific UDF to implement one or more functions used for query execution.

The script may include computer readable program code configured to cause a processor to configure a trigger for any setup for schema and data change notifications. The script may include computer readable program code configured to cause a processor to configure a change notification setup for any setup for schema and data change notifications.

Data uploaded via the UI may reside in the in-memory database 7120 and it may be joined with existing logical tables. Any query executed on these tables may be executed in the in-memory database 7120 if the referenced tables and the data are stored in the in-memory database 7120. If the query cannot be run in the in-memory database 7120, then the data tables may be uploaded to the external database 7200 in ephemeral temporary tables and the query may be executed by the external database 7200.

Schema and data change notifications may be used to update the logical model metadata and update the data index values in the relational search unit 7400. Any changes happening on the source system (i.e., external database 7200) may be pushed from the external database 7200 to the in-memory database 7120, the cloud database 7140, or both, through some support available in the external database 7200.

The external database 7200 may have the support functionality or functionality to achieve a similar effect that may be performed in near real time. Alternatively, instead of pushing the change notifications from the external database 7200, the changes may be periodically pulled from the low-latency database analysis system 7000. The external data source manager 4070 of FIG. 4 may be configured to monitor and track the changes occurring on the external database 7200. In some implementations, the monitoring and tracking may be periodic and not real time (i.e., the change notification could be delayed). In some implementations, statistics may be provided by the external database 7200 to infer the schema or data changes.

Figure 8:
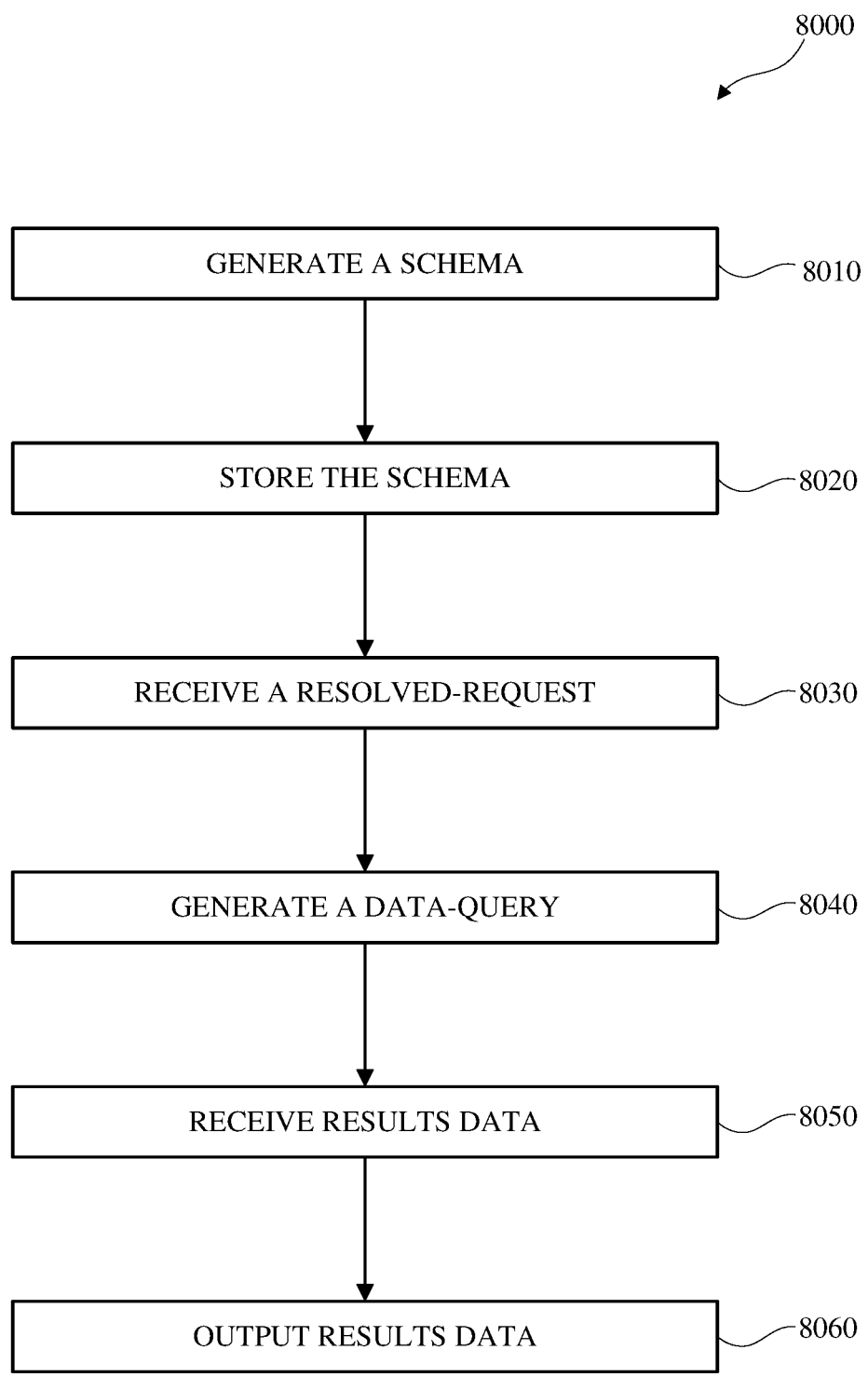
FIG. 8 is a flow diagram of an example of a method for use in a low-latency database analysis system.

FIG. 8 is a flow diagram of an example of a method 8000 for use in a low-latency database analysis system. The method 8000 may include generating a schema 8010. The schema may be based on a portion of an external database. The method 8000 may include storing 8020 the schema in an in-memory database. The in-memory database may be a low-latency database. The method 8000 may include receiving 8030 a search object such as a resolved-request. The method 8000 may include generating 8040 a data-query. The data-query may be based on the resolved-request and the stored schema. The stored schema may be used for executing the query on the external database. The method 8000 may include receiving 8050 results data responsive to the data-query from the external database. The method 8000 may include outputting 8060 the results data for display on a user interface.

In an example, the method 8000 may include determining a data change and generating a data change notification. The method 8000 may include transmitting the data change notification to a distributed cluster manager. The method 8000 may include tracking the data change to determine whether another change has occurred. The method 8000 may include storing prioritized data from the external database. The method 8000 may include fetching a column data value. Fetching the column data value may be in response to receiving a data change notification.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    generating, in an in-memory database of a database analysis system, an unpopulated database schema corresponding to a populated database schema stored in an external database;
    sending, by the database analysis system, to the external database, a data query generated by the database analysis system in accordance with the unpopulated database schema;
    obtaining, by the database analysis system, results data output by the external database in response to executing the data query; and
    outputting the results data.

2. The method of claim 1, wherein sending the data query includes:
    generating the data query, by the database analysis system, in response to receiving, by the database analysis system, a request for data.

3. The method of claim 2, wherein generating the data query includes:
    determining that an unpopulated table in the unpopulated database schema corresponds to a populated table in the external database.

4. The method of claim 1, wherein generating the unpopulated database schema includes generating the unpopulated database schema by an external database compute unit of the database analysis system.

5. The method of claim 1, wherein:
    obtaining the results data includes obtaining the results data by a semantic interface of the database analysis system; and
    outputting the results data includes:
        obtaining the results data by an interface unit of the database analysis system from the semantic interface;
        generating, by the interface unit, output data including at least a portion of the results data; and
        outputting the output data for presentation to a user.

6. The method of claim 1, wherein sending the data query to the external database includes:
    determining that an override mode indicating external execution is configured.

7. The method of claim 1, wherein sending the data query to the external database includes:
    determining that a previous external execution by the external database is associated with the data query.

8. The method of claim 1, wherein sending the data query to the external database includes:
    determining that cached data for a column indicated by the data query is unavailable from the in-memory database of a database analysis system.

9. A database analysis system comprising:
    an in-memory database;
    a memory storing instructions for low-latency database analysis using an external data source; and
    a processor that executes the instructions to:
        generate, in the in-memory database, an unpopulated database schema corresponding to a populated database schema stored in an external database;
        send, to the external database, a data query generated by the database analysis system in accordance with the unpopulated database schema;
        obtain results data output by the external database in response to execution of the data query; and
        output the results data.

10. The database analysis system of claim 9, wherein to send the data query the processor executes the instructions to:
    receive a request for data; and
    generate the data query in response to the request for data.

11. The database analysis system of claim 10, wherein to generate the data query the processor executes the instructions to:
    determine that an unpopulated table in the unpopulated database schema corresponds to a populated table in the external database.

12. The database analysis system of claim 9, wherein to generate the unpopulated database schema the processor executes the instructions to operate an external database compute unit of the database analysis system to generate the unpopulated database schema.

13. The database analysis system of claim 9, wherein:
    to obtain the results data the processor executes the instructions to operate a semantic interface of the database analysis system to obtain the results data by; and
    to output the results data the processor executes the instructions to:
        operate an interface unit of the database analysis system to:
            obtain the results data from the semantic interface;
            generate output data including at least a portion of the results data; and
            output the output data for presentation to a user.

14. The database analysis system of claim 9, wherein to send the data query to the external database the processor executes the instructions to:
    determine that an override mode indicates external execution is configured.

15. The database analysis system of claim 9, wherein to send the data query to the external database the processor executes the instructions to:
    determine that a previous external execution by the external database is associated with the data query.

16. The database analysis system of claim 9, wherein to send the data query to the external database the processor executes the instructions to:

determine that cached data for a column indicated by the data query is unavailable from the in-memory database.

17. A non-transitory computer-readable storage medium including executable instructions which when executed by one or more processors cause the one or more processors to perform operations comprising:
generating, in an in-memory database of a database analysis system, an unpopulated database schema corresponding to a populated database schema stored in an external database;
sending, by the database analysis system, to the external database, a data query generated by the database analysis system in accordance with the unpopulated database schema;
obtaining, by the database analysis system, results data output by the external database in response to executing the data query; and
outputting the results data.

18. The non-transitory computer-readable storage medium of claim 17, wherein sending the data query includes:
generating the data query, by the database analysis system, in response to receiving, by the database analysis system, a request for data.

19. The non-transitory computer-readable storage medium of claim 18, wherein generating the data query includes:
determining that an unpopulated table in the unpopulated database schema corresponds to a populated table in the external database.

20. The non-transitory computer-readable storage medium of claim 17, wherein generating the unpopulated database schema includes generating the unpopulated database schema by an external database compute unit of the database analysis system.

* * * * *